United States Patent [19]

Aronsson et al.

[11] 4,220,902

[45] Sep. 2, 1980

[54] ELECTRICAL VEHICLE TRACTION EQUIPMENT

[75] Inventors: Olle Aronsson; Kjell Frank; Lars Friden, all of Vesteras, Sweden

[73] Assignee: ASEA Aktiebolag, Vesteras, Sweden

[21] Appl. No.: 944,521

[22] Filed: Sep. 20, 1978

[30] Foreign Application Priority Data

Sep. 22, 1977 [SE] Sweden ............................ 7710611

[51] Int. Cl.² .............................................. H02P 3/14
[52] U.S. Cl. .................................... 318/434; 318/376; 361/15
[58] Field of Search ...................... 361/23, 31, 33, 30, 361/15; 318/434, 479, 393, 332, 349, 376; 323/9

[56] References Cited

U.S. PATENT DOCUMENTS

| 3,543,121 | 11/1970 | Miller | 318/393 |
| 3,569,810 | 3/1971 | Thiele | 318/434 |
| 3,803,454 | 4/1974 | Higuchi | 361/31 |
| 4,074,175 | 2/1978 | Born et al. | 318/332 |

Primary Examiner—David Smith, Jr.
Attorney, Agent, or Firm—Pollock, Vande Sande & Priddy

[57] ABSTRACT

An improved traction apparatus for electrical vehicles that are supplied with energy over a contact line and that utilize a filter capacitor to smooth the input current to a DC convertor that is used to energize a driving motor. The improvement concerns means for avoiding surges of filter capacitor charging current when the line voltage rises after a line voltage drop. A thyristor is used to pass current to the convertor when the line voltage remains within a particular operational range and to block the flow of current to direct the current to a current limiting resistor when the line voltage begins to rise after a short duration or relatively longer duration voltage drop.

9 Claims, 5 Drawing Figures

ELECTRICAL VEHICLE TRACTION EQUIPMENT

BACKGROUND OF THE INVENTION

The invention relates to traction equipment for an electric vehicle receiving power over a contact line and, more particularly, to such equipment including means for avoiding surges of capacitor charging current when the line voltage rises after a short duration or relatively longer duration line voltage drop.

It is known in the art to supply electric vehicles with power by means of a contact line that passes electrical energy to a current collector on the vehicle. Such vehicles may be provided with a static convertor for receiving DC line voltage from the current collector and distributing a corresponding DC driving voltage to a driving motor in the vehicle. Also, it is known to provide a filtering circuit at the input side of the convertor for smoothing the pulsed current that is supplied to the convertor.

Typically, such a filter comprises a reactor in one of the DC conductors and a line capacitor, generally having a considerable capacitance, connected between the DC conductors and situated between the reactor and the convertor. In certain cases the reactor is omitted and the filter then usually includes only the capacitor.

In the operation of the vehicle line voltage drops of long or short duration regularly occur on the contact line. Such voltage drops usually occur when the vehicle passes through dead sections of the contact line and in the case of so-called pantograph bounces. During a drop out of the line voltage, the capacitor is rapidly discharged by the load current of the convertor. When the voltage returns, a strong surge or charging current is generated to charge the capacitor to the line voltage of the contact line. The amplitude of the current surge is limited only to a minor extent by the reactor in the circuit, if one is present.

The charging current surge causes several different kinds of problems, including mechanical, electrical and thermal stresses on the components of the equipment, increased risk of tripping overcurrent protection circuits in the supply equipment of the contact line and in the vehicle and strong voltage transients in the line voltage with the associated risk of signal distrubances.

It is known to the art to partially avoid the above problems by arranging a current limiting resistor in the DC conductor between the capacitor and the current collector of the vehicle. During normal, undisturbed operation, the resistor is bridged by a contactor. If the line voltage drops, the contactor is opened and the resistor then limits the charging current when the line voltage returns. When the capacitor voltage approaches the level of the line voltage, the contactor is closed.

A contactor for relatively high voltage applications however, has a relatively long reaction time. Thus, in the case of a brief line voltage drop, such a contactor is not able to open during the short drop out interval and consequently, when the voltage returns, the capacitor is charged through the contactor and not through the resistor. Since even such short drop out intervals are sufficient to substantially discharge the capacitor, the subsequent charging current is strong and the above-mentioned charging problems will occur.

Accordingly, it is an object of the invention to provide traction apparatus having a simple and effective means to avoid the surges of capacitor charging current associated with a short duration or relatively longer duration line voltage drop.

A further object of the invention is to provide such surge protection despite arcing between the current collector and the voltage-carrying sections of the contact line.

These and other objects of the invention will become apparent from a review of the detailed specification which follows and a consideration of the accompanying drawings.

BRIEF SUMMARY OF THE INVENTION

The electrical vehicle traction apparatus, according to the invention, may be used with electric vehicles of a type wherein energy is supplied from a contact line and is passed to a convertor in the vehicle by a current collector. The convertor in such a vehicle should have a filter capacitor on its input side to smooth the input current from the current collector and should operate to supply driving energy to a vehicle drive motor.

In order to achieve the objects of the invention and to overcome the problems of the prior art, the electrical vehicle traction apparatus, according to the invention, includes a thyristor that is connected between the filter capacitor and the current collector and is operated to either pass current or block the flow of current.

The thyristor is operated by a control circuit that turns the thyristor on to pass current from the current collector to the convertor to drive the vehicle when the voltage supplied by the contact line is within specified limits. However, when the line voltage drops below a specified level, the control circuit operates to turn off the thyristor to block the flow of current through the thyristor and to thereby shunt the current that is generated by the subsequent rise of line voltage to a current limiting network.

In one embodiment of the invention, the current limiting network includes a current limiting resistor. Other embodiments employ switches to operate in combination with the thyristor to pass driving current or to shunt current to a current limiting resistor.

The control circuit may include means for sensing the filter capacitor voltage and the line voltage and for operating the thyristor to block the flow of current to shunt the current to a limiting resistor if the difference between the line voltage and the filter capacitor voltage exceeds a predetermined level. Likewise, if the difference between the line voltage and capacitor voltage is less than the predetermined level, the thyristor is caused to conduct to drive the vehicle motor.

The apparatus of the invention may include means for detecting the derivative of the line voltage to determine whether there has been a rapid decrease in line voltage under circumstances where the difference between the capacitor and line voltages does not reflect such a change, for example when there is arcing between the contact line and the current collector.

DETAILED DESCRIPTION OF PREFERRED EMBODIMENTS

Figure 1:
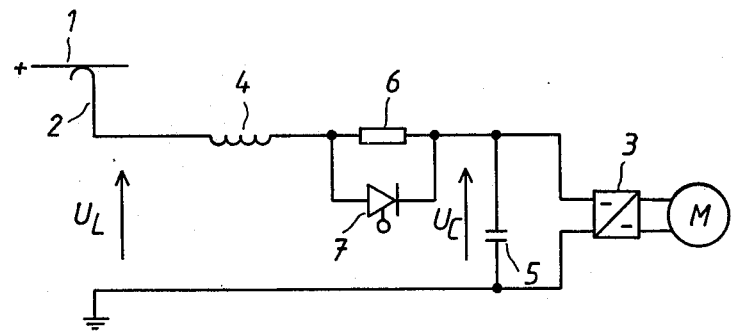
FIG. 1 shows a circuit diagram of a charging control circuit according to the invention.

The remaining portion of this specification will describe preferred embodiments of the invention when read in conjunction with the attached drawings in which like reference characters identify identical apparatus.

Figure 2:
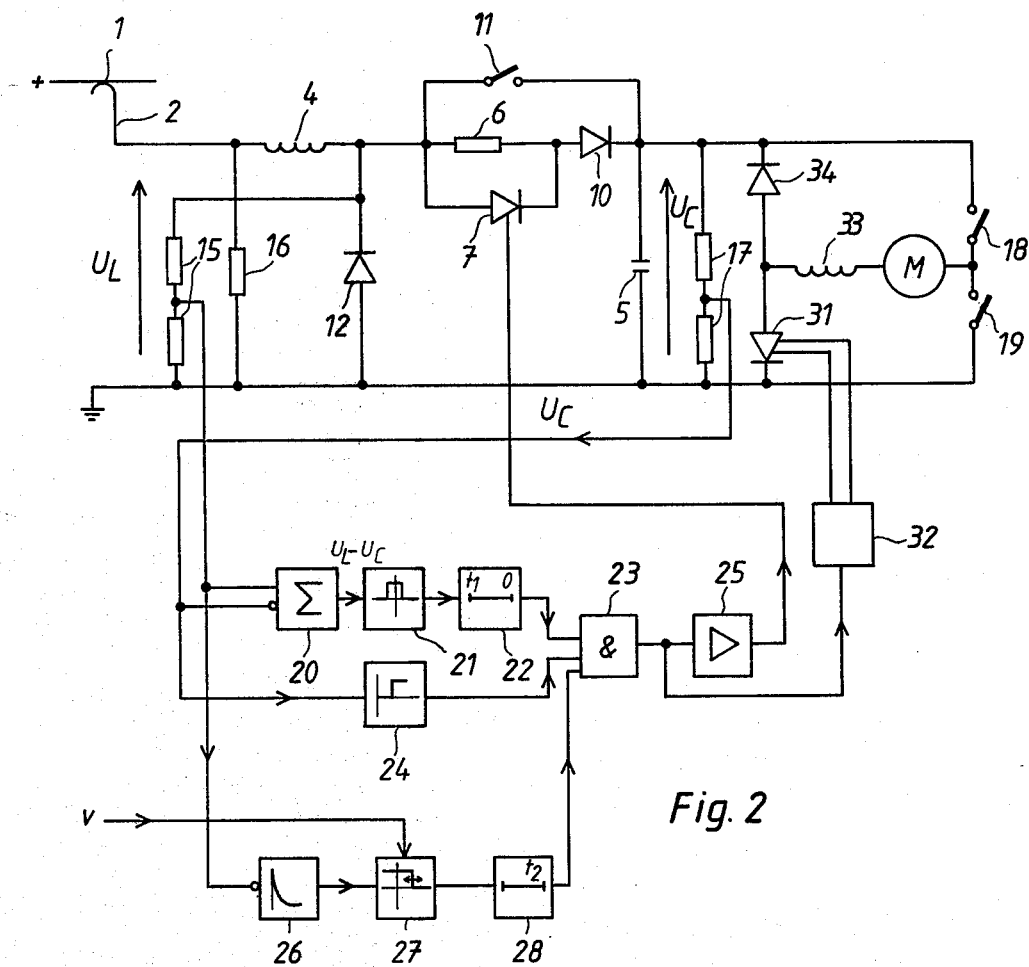
FIG. 2 shows a more detailed circuit diagram of the circuit of FIG. 1.

FIG. 2 shows a circuit diagram for the traction apparatus of a vehicle, which may be a railbound vehicle, a trolley bus or the like. Power is supplied to the apparatus from a contact line or rail 1 having a positive DC voltage and through a current collector 2 disposed on the vehicle. The DC voltage is supplied to a drive motor M by means of a convertor 3.

If the motor is a DC motor, the convertor is then suitably a DC convertor that supplies voltage pulses to the motor. Typically, such DC pulses may have a variable pulse frequency or pulse width for controlling the motor current and thus the tractive force of the motor and the acceleration and speed of the vehicle.

Alternatively, the motor may be an AC motor, for example an induction motor, and the corresponding convertor may be an inverter with a variable output frequency or output voltage.

The direct current to the convertor is pulsating if a DC convertor is used and under all circumstances the current contains relatively great AC components. Thus, for filtering the current, a filter is arranged on the input side of the convertor 3 between the convertor and the current collector 2. The filter may include a reactor 4 and a capacitor 5. For limiting the charging current to the capacitor following startup or after brief drops of the line voltage, a resistor 6 is connected in series with the reactor 4. A controllable semiconductor device, for example a thyristor 7 is connected in parallel with the resistor with its direction of conduction coinciding with the direction of the current when the motor is driven.

The term "driving" as used in the preceding paragraph relates to the operating case in which power is fed from the contact line to the motor. During the opposite operating case, "braking," power flows from the motor to the contact line, if regenerative braking is used.

During normal, undisturbed driving operation, a continuous control signal is supplied to the thyristor to maintain the thyristor in a conducting condition with the load current flowing through the thyristor. However, when the vehicle is started, the capacitor voltage Uc is zero and the thyristor is turned off since a control signal is not initially applied. Thus, the charging current flows through the current limiting resistor 6 and the charging current is thereby limited. As the capacitor charges, the difference between the line voltage $U_L$ and the capacitor voltage Uc decreases and when the difference between $U_L$ and Uc reaches a predetermined trigger level, a control signal is applied to ignite the thyristor to shunt the load current past the resistor 6. Thus, the thyristor 7 operates to connect the resistor 6 to limit the current when the capacitor 5 is charging and operates to disconnect the resistor 6 from the circuit after the capacitor 5 has been sufficiently charged.

Likewise, when the line voltage is reduced by a certain amount, or if the line voltage drops out, the control signal to the thyristor is removed and the thyristor is turned off. When the line voltage resumes its original value, the thyristor blocks the load current when then flows through the resistor 6. The capacitor is then charged through the resistor 6 until the capacitor voltage reaches a level sufficient to ignite the thyristor 7 to short-circuit the resistor 6 and apply the line voltage to the capacitor without causing a high surge of charging current.

Because the thyristor reacts extremely quickly, protection is provided against charging current surges due to very brief drop outs of the line voltage that are caused, for example, by pantograph bounces. Thus, the apparatus of the invention avoids the surges of charging current that have occurred in prior art apparatus in response to brief drops in line voltage.

The apparatus of the invention may be suitably supplemented with means for blocking the convertor 3 during voltage drop outs or other considerable reductions of the line voltage to prevent the capacitor from being discharged by the load current of the convertor. Thus, after the line voltage returns, the difference between the line voltage and the capacitor voltage will be relatively smaller than would have been the case if the convertor had not been blocked and consequently, the charging current surge will be further reduced.

FIG. 2 shows a more detailed illustration of the circuit of FIG. 1. A diode 10 is connected in series with the resistor 6 to block the capacitor voltage in case of a drop out or other reduction of the line voltage. In this way a possible discharge of the capacitor 5 through the resistor 6 is prevented. In addition, a further advantage of the diode 10 is that the voltage $U_L$, a measure of the line voltage, is not affected by the capacitor voltage.

Furthermore, a contactor 11 is arranged, upon regenerative braking, to bridge the resistor 6 and the diode 10 to enable the braking current to flow from the motor to the contact line. Also, a free-wheeling diode 12 is included to protect the components 7 and 10 if the contactor 11 opens while current is flowing through the reactor 4 to the line.

A resistive voltage divider 15 is provided for measuring the line voltage $U_L$ and a resistor 16 with a relatively high resistance provides a well-defined zero value of the voltage $U_L$ when the line voltage drops out. A voltage divider 17 is provided for measuring the capacitor voltage $U_C$.

The convertor 3 includes a DC convertor known to the art with a thyristor 31 that is provided with a turn-off circuit. The thyristor alternately receives ignition and turn-off signals from a control device 32 (for instance according to U.S. Pat. No. 3,555,437).

A smoothing reactor 33 is arranged in series with the DC motor M. The smoothing reactor may completely or partially consist of the field winding of the motor. A free-wheeling diode 34 conducts the motor current during the off-state interval of the thyristor 31. Also, a contactor 18 is closed while the motor M is being driven and a contactor 19 is closed during braking of the motor.

The measurement values of $U_L$ and $U_C$ obtained from the voltage dividers 15 and 17 are supplied to a summation circuit 20 which forms a signal corresponding to the difference $U_L-U_C$. This signal is supplied to a level detector 21. The detector 21 delivers a logical one if $U_L-U_C$ is between a predetermined positive and a predetermined negative value, and a logical zero if $U_L-U_C$ lies outside of these values. In a typical case, if the line voltage is 600 V, the two levels could be chosen to be +150 V and −150 V.

The output signal from the detector 21 is supplied to an AND gate 23 through a delay circuit 22. The circuit 22 delays a 0 to 1 transition (but not a 1 to 0 transition) to such an extent that a one cannot be supplied to the AND gate 23 when $U_L$ passes $U_C$ after a line voltage drop out.

The signal $U_C$ is further supplied to a level detector 24 which emits a zero if $U_C$ is smaller than a predetermined value, for example 300 V at a main voltage of 600 V. The switching level of the detector 24 should be selected so as to be lower than the lowest line voltage at which it is desirable for the equipment to be able to operate normally while driving the motor. The detector 24 prevents the thyristor 7 from receiving a control signal when the equipment is started up by switching the line voltage into the circuit.

If the output of the detectors 21 and 24 are both ones, a one is generated by the AND gate 23 (apart from the time delay in the circuit 22). The signal at the output of the gate 23 is supplied to a control pulse device 25 that emits a continuous control signal to the thyristor 7 and continues to emit the signal for as long as the output from the gate 23 remains a one.

The output signal from the AND gate 23 may further be supplied to the control device 32 of the convertor 3. If the signal is a zero the convertor is blocked, that is the control pulses are not supplied to its semiconductor valves and the convertor stops working. If the signal is a one, the convertor is allowed to operate.

During the driving of the motor M, the contactor 18 is closed and the contactors 11 and 19 are opened. When the equipment is started up and connected to the line, $U_C=0$ and if, for example, $U_L=600$ V, then $U_L-U_C=600$ V and the output from the detectors 21 and 24 is zero. Therefore, the convertor 3 is blocked, control signals are not passed to the thyristor 7, and the capacitor 5 is charged through the resistor 6.

When $U_C$ reaches the value determined by the detector 24, the output signal from the detector is a one. Thereafter, when $U_C$ reaches such a value that $U_L-U_C$ becomes smaller than the upper switching value determined by the detector 21, the output signal from the circuit 22 becomes a one after a suitable delay and the thyristor 7 then receives a control signal to begin conducting to bypass the resistor 6 to rapidly charge up the capacitor 5 to the line voltage and to remove the block signal from the connector 3.

During undisturbed operation, $U_C$ is approximately equal to $U_L$ and the thyristor 7 receives a continuous control signal to remain conducting despite slight temporary variations of $U_L$. In the event of a sudden substantial reduction of the line voltage or a drop out of the line voltage, the output signal from the detector 21 becomes a zero. Thus, a drop out of the line voltage will reduce $U_L$ to zero and the difference between $U_L$ and $U_C$ will be a large negative value, for example $U_L-U_C=-600$ V. Thereafter, the control signal to the thyristor 7 will be quickly terminated and the convertor 3 will be blocked.

Through the influence of diode 10 and by blocking the convertor, the capacitor 5 will be discharged relatively slowly. Therefore, for brief voltage drop outs, $U_L-U_C$ will, after the return of the line voltage, be below the switching level of the detector 21. Thus, the thyristor 7 will immediately receive a control pulse (apart from the delay in 22) and will become conducting and the convertor will be immediately activated. The operation is thus continued immediately and with a minimum of disturbance.

During voltage drop outs of somewhat longer duration, the capacitor will unavoidably be discharged so far that, when the voltage returns, $U_L-U_C$ will be above the upper switching level of the detector 21 and $U_C$ will have possibly dropped below the switching level of the detector 24. Thus, when the main voltage returns, the output signal from the detector 21 and possibly also of the detector 24, will be zero. The zero signals on the detectors will cut off the control signal to the thyristor 7 and the charging current for the capacitor 5 will flow through the current limiting resistor 6. When the capacitor has been sufficiently charged, the output signals from the detectors 21 and 24 will become ones and the thyristor 7 will be ignited and the convertor 3 will be activated.

When the vehicle moves from a voltage-carrying line section to a dead line section there is a risk in certain cases of an arc arising between the voltage-carrying sections and the current collector. Such an arc might cause the difference between $U_L$ and $U_C$ to remain zero and thereby raise the risk of a high charging current surge when the vehicle again approaches a current-carrying section. To avoid this problem, a derivative sensing circuit 26 may be employed.

In operation, the line voltage $U_L$ is supplied to the derivative circuit 26 with an inverting input. The output signal from this circuit is supplied to a level sensing circuit 27. The sensing level of this circuit may be constant or, as shown in FIG. 2, it may also be dependent on the vehicle speed v. The sensing level could have a low value, for example, of 2 V/ms at a vehicle speed of zero and increase with the vehicle speed up to a high value, for example 5 V/ms, at the maximum vehicle speed.

The output signal from the circuit 27 is applied to a delay circuit 28 that delays the change from "1" to "0" (but not the change from 0 to 1) by the time $t_2$, for example 5–10 ms. This prevents unjustified blocking of the thyristor 7 and the convertor thyristor 31.

In undisturbed operation, the time derivative of $U_L$ is low and the output signals from the circuits 27 and 28 are therefore "one." If the vehicle arrives at a section carrying no voltage but maintains the contact with the preceding section via an arc, the components 20–22 will not react as mentioned above and no blocking of the thyristor 7 and the convertor 31 would then take place. However, in this case $U_L$ is reduced so rapidly that the switching level of the circuit 27 is exceeded and the output of the circuit 27 then switches from "1" to "0." Also, after a time $t_2$ the output of the circuit 28 switches from "1" to "0." Thus, the output signal from the AND gate 23 becomes zero to turn off or block the thyristor 7 and block the convertor thyristor 31.

The sensing of the line voltage by the derivative protection circuit 26, 27 and 28 is performed in FIG. 2 to the right of the inductor 4 through the voltage divider 15, to provide a lower harmonic content in the measured signal. However, the sensing of the line voltage for the derivative protection circuit could alternatively be carried out on the left side of the inductor 4.

In the case of regenerative braking, the contactor 18 is switched off and the contactors 11 and 19 are switched on. The thyristor 7 and its control equipment then have no function, and problems with charging current surges will not arise in this form of operation. It should be appreciated that the contactors 11, 18 and 19 could be manually operated in accordance with the operation of a vehicle brake control.

The contactor 11 could be replaced by a thyristor with a conducting direction to the left in the figure, the thyristor being held ignited during braking and extinguished during driving. During braking, the thyristor would then bridge the resistor 6, diode 10 and thyristor 7 in the same way as the contactor 11. Alternatively, the contactor 11 could be replaced by a diode with a conducting direction to the left in the figure.

In certain cases there may be a disadvantage to blocking the convertor 3 in response to reductions of the line voltage. Therefore, instead of using the blocking gate 23 in FIG. 2, it is possible to provide a separate gating means to block the convertor 3. Such a separate gate could respond to additional gating conditions to block the convertor, for example, blocking only if the line voltage is greater than the capacitor voltage or if the line or capacitor voltage is below the smallest allowable level.

Figure 3A:
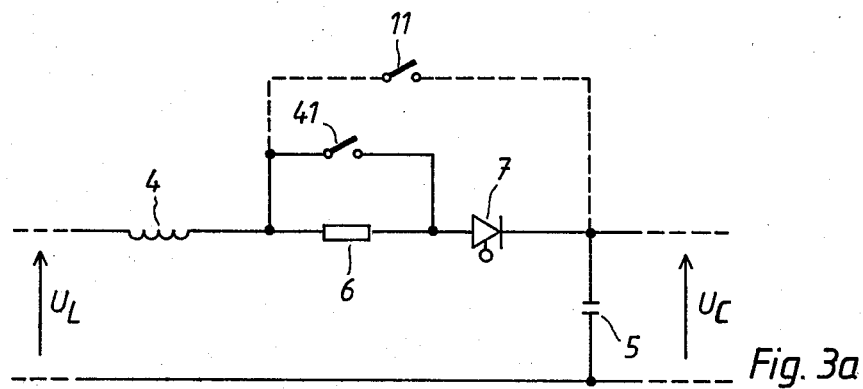
FIGS. 3a and 3b show alternative embodiments of the invention having differing locations for the controllable semiconductor valve of FIG. 1.

FIG. 3a shows another embodiment of the invention in which the thyristor 7 is arranged in series with the resistor 6. On starting the equipment, a contactor 41 is opened and the thyristor 7 receives a continuous control signal. The capacitor 5 is then charged through the resistor 6 and the thyristor 7 and when the difference between $U_L$ and $U_C$ has become sufficiently small, the contactor 41 is closed and the resistor 6 is bridged. If the line voltage drops out or a sudden substantial reduction of the voltage occurs, the control signal to the thyristor is instantaneously removed and the contactor 41 is opened. When the voltage returns, the thyristor is again ignited, but not until the contactor 41 has had ample time to open, and the capacitor is charged in the same way as when starting the equipment. As in FIG. 2, the thyristor 7 in the embodiment of FIG. 3a prevents the charging current surge that was a disadvantage in previously known equipment. It should be appreciated that the contactor 11 of FIG. 3a is activated upon braking as for the circuit of FIG. 2.

Figure 3B:
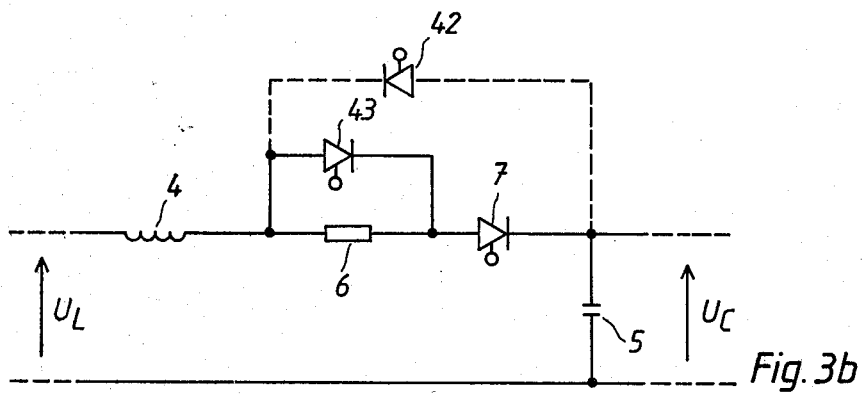

In addition, either or both of the contactors in FIG. 3a can be replaced by thyristors. FIG. 3b shows a connection according to FIG. 3a in which both contactors are replaced by thyristors 42 and 43.

Figure 4:
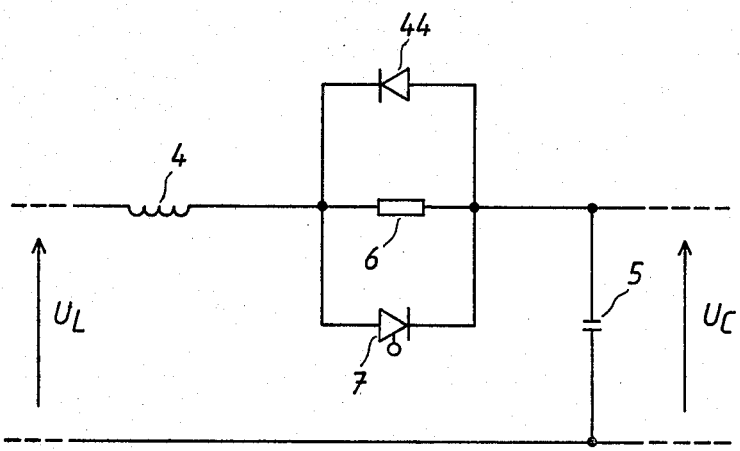
FIG. 4 shows an alternative embodiment of the invention with respect to the embodiment illustrated in FIG. 2.

FIG. 4 shows, as an alternative to the contactor 11 in FIG. 2, how a diode 44 can be arranged to bridge the resistor 6 and the thyristor 7 during regenerative braking, in which case the diode 10 in FIG. 2 can be omitted.

The foregoing description relates to equipment according to the invention in which a convertor is supplied with direct current directly from a contact line carrying DC voltage. The equipment according to the invention can also be used for such vehicles if the convertor is supplied from a contact line carrying AC voltage through a rectifier.

In the equipment mentioned above, the thyristor 7 may be blocked both in the case of a drop out of the voltage supply and in the case of a sudden reduction of the line voltage below a certain amount, such reduction being determined by measuring the line and capacitor voltages. The indication of a drop out of the voltage supply, however, can be made by alternative methods.

In the apparatus according to the invention, a controllable semiconductor element is arranged in one supply conduit between the current collector and the capacitor. In the case of a drop out of the line voltage, the semiconductor element is quickly blocked. Thereafter, at the time of or before the return of the line voltage, a current limiting resistor may be connected to the circuit to limit the flow of current until the semiconductor element is switched to the onstate. Also, in the case of very short line voltage drop outs, complete protection against unacceptably high charging current surges is obtained. Since the semiconductor element provides for both the connection and disconnection of the current limiting resistor, the apparatus of the invention is both simple and reliable.

The invention may be embodied in other specific forms without departing form its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. Traction apparatus for an electric vehicle of a type wherein energy is supplied from a contact line and passed to a convertor in said vehicle by a current collector, said convertor having a filter capacitor on its input side for smoothing its input current and having an output for supplying energy to a drive motor, the improvement comprising:
    controllable semiconductor means connected between said filter capacitor and said current collector for operating in one state to pass current and operating in another state to block the flow of current;
    control means for operating said controllable semiconductor means to pass the input current from said current collector to said convertor to drive said vehicle and responsive to a drop in the line voltage supplied to said vehicle to operate said controllable semiconductor means to block the flow of current therethrough;
    and current control means operatively associated with said controllable semiconductor means to limit the flow of the input current to said filter capacitor when said controllable semiconductor means is operated to block the flow of current therethrough, thereby avoiding a current surge at said filter capacitor.

2. The traction apparatus of claim 1 wherein said control means includes means for sensing the filter capacitor voltage and the contact line voltage and operating said controllable semiconductor means to block the flow of current if the difference between the contact line voltage and the filter capacitor voltage exceeds a predetermined level.

3. The traction apparatus of claim 2 wherein said control means includes means for blocking the convertor when said controllable semiconductor is operated to block the flow of current.

4. The traction apparatus of claim 1 wherein said control means includes means for blocking the convertor when said controllable semiconductor means is operated to block the flow of current.

5. The traction apparatus of claim 1 wherein said current control means includes a resistor connected in parallel with said controllable semiconductor means for limiting the charging current of said filter capacitor.

6. The traction apparatus of claim 5 wherein said current control means further includes a diode connected in series to said resistor.

7. The traction apparatus of claim 1 wherein said current control means includes a resistor for limiting the charging current of said filter capacitor, said resistor being connected in series with said controllable semiconductor means; and switching means connected in parallel with said resistor to bridge the resistor.

8. The traction apparatus of claim 1 including a switching means connected in parallel with said controllable semiconductor means for bridging the controllable semiconductor means during regenerative braking of the drive motor.

9. The traction apparatus of claim 1 wherein the controllable semiconductor means is a thyristor.